United States Patent
Li et al.

(10) Patent No.: US 11,943,292 B2
(45) Date of Patent: Mar. 26, 2024

(54) EXTEND CONTROLLER FOR MULTI-TENANCY

(71) Applicant: International Business Machines Corporation, Armonk, NY (US)

(72) Inventors: Peng Li, Xian (CN); Guangya Liu, Cary, NC (US); Xun Pan, Xian (CN); Hai Hui Wang, Xian (CN); Xiang Zhen Gan, Xian (CN); Xin Peng Liu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/858,142

(22) Filed: Jul. 6, 2022

(65) Prior Publication Data

US 2024/0015213 A1   Jan. 11, 2024

(51) Int. Cl.
*H04L 67/1095* (2022.01)
*H04L 67/02* (2022.01)
*H04L 67/133* (2022.01)

(52) U.S. Cl.
CPC .......... *H04L 67/1095* (2013.01); *H04L 67/02* (2013.01); *H04L 67/133* (2022.05)

(58) Field of Classification Search
CPC ..... H04L 41/40; H04L 41/0895; H04L 67/10; H04L 67/1095
See application file for complete search history.

(56) References Cited

U.S. PATENT DOCUMENTS

| | | | |
|---|---|---|---|
| 10,708,082 B1 | 7/2020 | Bakiaraj | |
| 11,121,921 B2* | 9/2021 | Parker | G06F 9/542 |
| 2015/0139238 A1 | 5/2015 | Pourzandi | |
| 2020/0228402 A1* | 7/2020 | Parker | G06F 9/45533 |
| 2021/0144517 A1 | 5/2021 | Guim Bernat | |
| 2021/0312392 A1 | 10/2021 | Zhou | |
| 2021/0314300 A1* | 10/2021 | Shen | H04L 12/66 |
| 2021/0374156 A1* | 12/2021 | Lenhard | G06F 16/273 |
| 2022/0019367 A1 | 1/2022 | Freilich | |
| 2022/0107842 A1* | 4/2022 | Jiang | G06F 9/5061 |
| 2022/0158926 A1* | 5/2022 | Wennerström | H04L 43/20 |
| 2022/0188170 A1* | 6/2022 | Smith | G06F 9/547 |
| 2022/0278927 A1* | 9/2022 | Mariappan | H04L 45/02 |
| 2022/0329505 A1* | 10/2022 | Malhotra | G06F 9/542 |

(Continued)

OTHER PUBLICATIONS

C. Zheng, Q. Zhuang and F. Guo, "A Multi-Tenant Framework for Cloud Container Services," in 2021 IEEE 41st International Conference on Distributed Computing Systems (ICDCS), DC, USA, 2021 pp. 359-369.doi: 10.1109/ICDCS51616.2021.00042. (Year: 2021).*

(Continued)

*Primary Examiner* — Chirag R Patel
(74) *Attorney, Agent, or Firm* — Heather Johnston

(57) ABSTRACT

A system may include a memory and a processor in communication with the memory. The processor may be configured to perform operations. The operations may include registering a custom resource definition for a tenant with a host and scaling a controller for the customer resource definition. The operations may include generating a replication using the customer resource definition, injecting information into the replication, and syncing a status of the custom resource definition between the host and the tenant.

17 Claims, 9 Drawing Sheets

(56) References Cited

U.S. PATENT DOCUMENTS

2023/0020330 A1* 1/2023 Schwerin .............. G06F 16/256
2023/0126045 A1* 4/2023 Pan ....................... G06F 9/5022
                                                          718/104

OTHER PUBLICATIONS

List of IBM Patents or Patent Applications Treated as Related, Filed Jul. 15, 2022.

Liu et al., "Dynamic Light-Weighted Multi-Tenancy", U.S. Appl. No. 17/858,147, filed Jul. 6, 2022.

He et al., "Efficient Large-Scale Multiple Migration Planning and Scheduling in SDN-enabled Edge Computing ", arXiv:2111.08936v1 [cs.NI] Nov. 17, 2021, 15 pages.

Kim et al., "Optimal Container Migration for Mobile Edge Computing: Algorithm, System Design and Implementation", Received Nov. 12, 2021, accepted Nov. 26, 2021, date of publication Nov. 30, 2021, date of current version Dec. 6, 2021, Digital Object Identifier 10.1109/ACCESS.2021.3131643, 17 pages.

Mell et al., "The NIST Definition of Cloud Computing", Recommendations of the National Institute of Standards and Technology, NIST Special Publication 800-145, Sep. 2011, 7 pages.

Shapira et al., "Building and Scaling a Control Plane for 1000s of Kafka Clusters", Presentation Transcript, Nov. 6, 2021, 7 pages, <https://www.infoq.com/presentations/kafka-clusters-control-plane/>.

Singla et al., "Control Plane for Distributed Kubernetes PaaS", Blog, Published Nov. 15, 2019, 7 pages.

Zheng et al., "A Multi-Tenant Framework for Cloud Container Services", arXiv:2103.13333v1 [cs.DC] Mar. 24, 2021, 11 pages.

* cited by examiner

EXTEND CONTROLLER FOR MULTI-TENANCY

BACKGROUND

The present disclosure relates to distributed system workload management, and, more specifically, to user tenancy management in distributed systems.

Workload scheduling and workload distribution are common functions in the computer field, including in distributed systems. Distributed systems may include, for example, open-source container systems. Open-source containers offer adaptive load balancing, service registration, deployment, operation, resource scheduling, and capacity scaling. Centralized modules may be used for workload scheduling and distribution.

An open source container environment may host multiple tenants; for example, one super cluster may host seven tenants. Properly hosting multiple tenants in an open source container environment may require adaptations of the environment. Various mechanisms may be employed to manage hosting multiple tenants; for example, a super cluster may host multiple individual control planes (e.g., virtual clusters) each with independent resources (e.g., servers and controller managers) on a shared data plane.

SUMMARY

Embodiments of the present disclosure include a system, method, and computer program product for an extend controller mechanism for multi-tenancy use of an open source container environment.

A system in accordance with the present disclosure may include a memory and a processor in communication with the memory. The processor may be configured to perform operations. The operations may include registering a custom resource definition for a tenant with a host and scaling a controller for the customer resource definition. The operations may include generating a replication using the customer resource definition, injecting information into the replication, and syncing a status of the custom resource definition between the host and the tenant.

In some embodiments of the present disclosure, the operations may include notifying the host of requirements for the tenant. In some embodiments, the host may generate the replication using the requirements.

In some embodiments of the present disclosure, the information may be injected into the replication using a pod webhook.

In some embodiments of the present disclosure, an event-driven autoscaling tool scales the controller.

In some embodiments of the present disclosure, the operations may include enhancing the custom resource definition for a sensitivity of the tenant.

In some embodiments of the present disclosure, the operations may include enabling communication between the replication and a server.

In some embodiments of the present disclosure, the information may be application programming interface information.

A computer implemented method in accordance with the present disclosure may include registering a custom resource definition for a tenant with a host and scaling a controller for the customer resource definition. The method may include generating a replication using the customer resource definition, injecting information into the replication, and syncing a status of the custom resource definition between the host and the tenant.

A computer program product in accordance with the present disclosure may include a computer readable storage medium having program instructions embodied therewith. The program instructions may be executable by a processor to cause the processor to perform a function. The function may include registering a custom resource definition for a tenant with a host and scaling a controller for the customer resource definition. The function may include generating a replication using the customer resource definition, injecting information into the replication, and syncing a status of the custom resource definition between the host and the tenant.

The above summary is not intended to describe each illustrated embodiment or every implementation of the disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
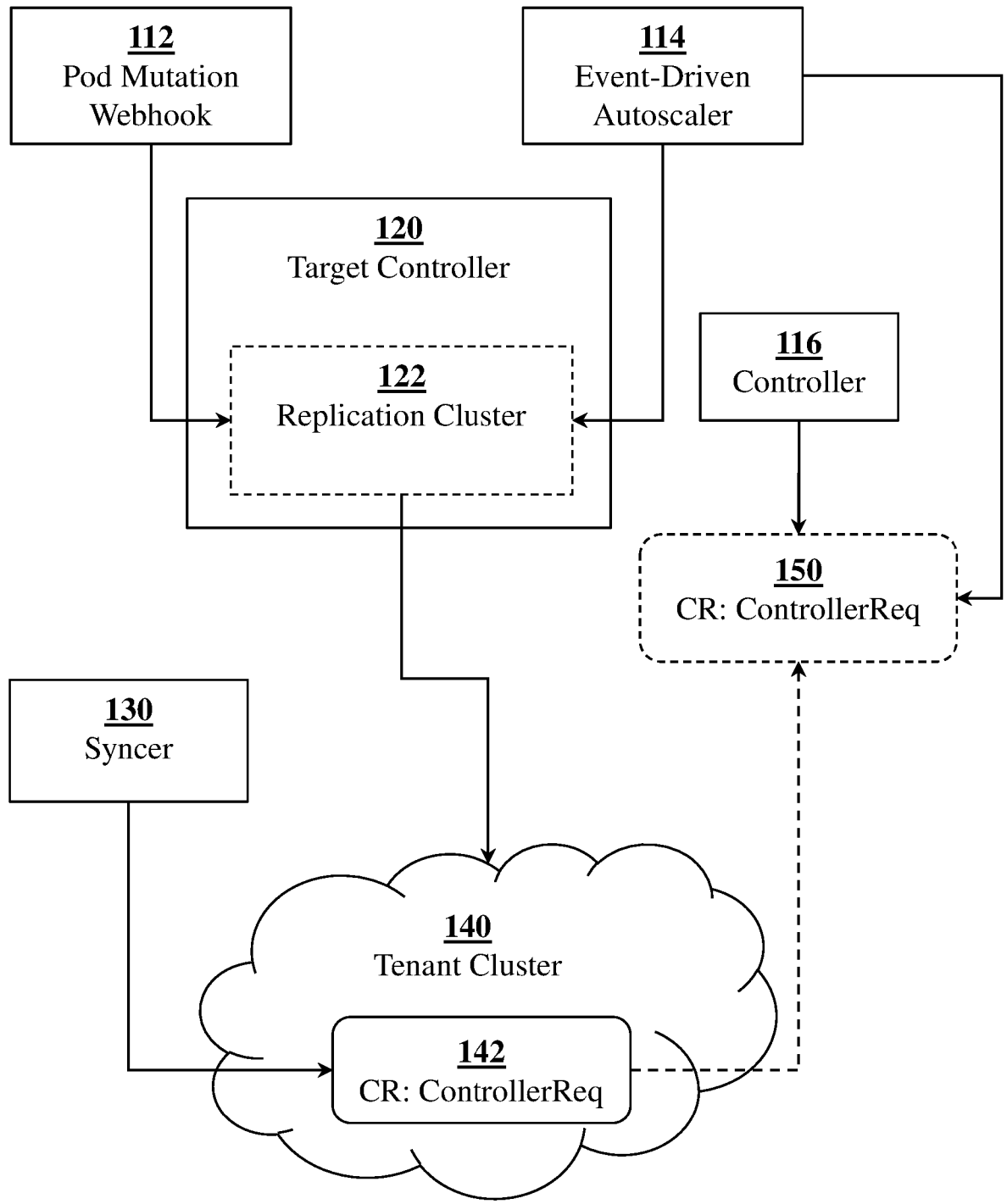
FIG. 1 illustrates a super cluster system in accordance with some embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to distributed system workload management, and, more specifically, to user tenancy management in distributed systems.

An open source container environment may host multiple tenants; various mechanisms may be employed to manage hosting multiple tenants. In accordance with some embodiments of the present disclosure, an environment may share one application between multiple tenants, thereby reducing the need for duplication of application instances for each tenant that may use such an application. In accordance with some embodiments of the present disclosure, a controller-based application may be adopted by tenants.

In accordance with some embodiments of the present disclosure, a controller may be scaled up or down based on tenant need and/or requirements; replications may be generated and/or terminated based on tenant demand. In some embodiments, one replication may be used per tenant; in some embodiments, each such replication may be a cluster for a specific tenant and may be referred to as a tenant cluster.

In some embodiments of the present disclosure, information may be injected into replications. For example, a pod mutation webhook may inject application programming interface (API) information into a replication (e.g., a related tenant cluster).

In some embodiments of the present disclosure, generation and/or termination of a replication may be done manually, automatically, on demand, and/or on a schedule. For example, a super cluster may automatically generate a new replication every day at a specific time to perform a specific task and terminate the replication upon the completion of that task. For example, a super cluster may automatically generate a scheduled replication and also generate another replication because a user logged into a system and requested a replication.

In accordance with the present disclosure, an on-demand approach may be used. For example, a tenant cluster administrator may require a functionality supported by a controller; the functionality may already have been manually installed in the super cluster. In some embodiments, the functionality may have been installed in the super cluster by generating a custom resource (CR). In some embodiments, the required functionality may be dismissed by deleting the CR. Deleting the CR may result in any resources that the CR was using once again becoming available to the super cluster for redeployment for another application.

In accordance with the present disclosure, an automatic approach may be used. For example, a user may engage a super cluster for a tenancy, and the super cluster may automatically generate a new tenancy for the user. In some embodiments, the super cluster may check every registered custom resource definition (CRD) to identify which, if any, are tenant sensitive. In some embodiments, the super cluster may determine which, if any, registered CRDs may scale up a related controller replication. The super cluster may identify a tenant sensitive, scalable CRD and use that CRD to automatically generate a new replication.

A system in accordance with the present disclosure may include a memory and a processor in communication with the memory. The processor may be configured to perform operations. The operations may include registering a custom resource definition for a tenant with a host and scaling a controller for the customer resource definition. The operations may include generating a replication using the customer resource definition, injecting information into the replication, and syncing a status of the custom resource definition between the host and the tenant.

In some embodiments of the present disclosure, the operations may include notifying the host of requirements for the tenant. In some embodiments, the host may generate the replication using the requirements.

In some embodiments of the present disclosure, the information may be injected into the replication using a pod webhook.

In some embodiments of the present disclosure, an event-driven autoscaling tool scales the controller. In some embodiments, the event-driven autoscaling tool may be an open-source event driven autoscaler (EDA) such as a Kubernetes® event-driven autoscaler (KEDA).

In some embodiments of the present disclosure, the operations may include enhancing the custom resource definition for a sensitivity of the tenant.

In some embodiments of the present disclosure, the operations may include enabling communication between the replication and a server.

In some embodiments of the present disclosure, the information may be application programming interface information.

FIG. 1 illustrates a super cluster system 100 in accordance with some embodiments of the present disclosure. The super cluster system 100 includes a target controller 120, a syncer 130, and a tenant cluster 140.

The super cluster system 100 includes a pod mutation webhook 112 in communication with a replication cluster 122 in the target controller 120. The pod mutation webhook 112 may watch the super cluster system 100 for information to inject into the replication cluster 122. For example, the pod mutation webhook 112 may watch for a change in a custom resource specification and/or directions from a control node (e.g., via an API server) and inject any new, additional, and/or changed tenant cluster information into the replication cluster 122.

The pod mutation webhook 112 may perform one or more tasks. For example, the pod mutation webhook 112 may adopt one or more HostAliases; the pod mutation webhook 112 may adopt HostAliases, for example, to change, update, or otherwise alter components of the host cluster and/or the replication cluster 122 of the target controller 120. The pod mutation webhook 112 may adopt HostAliases to enable watching the API of the tenant cluster 140.

In some embodiments, the pod mutation webhook 112 may update a credential token bond for the pod. In some embodiments, the credential token may be stored in a secret such that updating the credential token bond can be achieved by replacing the secret in the pod definition.

The super cluster system 100 includes an event-driven autoscaler 114. The event-driven autoscaler 114 may scale the target controller 120 to meet a resource request or dismiss a resource that is no longer in use. The replication cluster 122 is shown in dashed lines to indicate that it was newly added to the super cluster system 100. The replication cluster 122 may be a transient component, that is, generated on demand and dismissed when no longer in use.

The event-driven autoscaler 114 is shown in direct communication with the replication cluster 122. In some embodiments, the event-driven autoscaler 114 may be in indirect communication with the replication cluster 122, in direct communication with the tenant controller 120, and/or in indirect communication with the tenant controller 120.

The scaling (e.g., whether and how much to scale a controller and/or replication up or down) may depend on one or more manual and/or automatic triggers. For example, a new user may notify the super cluster system 100 of a desire for a new tenancy, and the event-driven autoscaler 114 may generate a new replication cluster 122 to satisfy the request. In another example, a user may complete the task the replication cluster 122 was generated for, and the event-driven autoscaler 114 may identify the task completion and dismiss the replication cluster 122.

The target controller 120 is in communication with a tenant cluster 140. The tenant cluster 140 includes a controller requirement 142 for a custom resource (CR) in communication with a syncer 130. The controller requirement 142 may be a CRD. The controller requirement 142 may communicate to the super cluster of one or more needs of the tenant cluster 140; for example, the controller requirement 142 may notify a host cluster that the tenant cluster 140 is in need of a certain controller (e.g., target controller 120).

The controller requirement 142 may communicate with a syncer 130. The syncer 130 may watch for CR related information and/or updates in the tenant cluster 140 and/or the hosting super cluster. The syncer 130 may, upon discovering a change (e.g., a new resource request or use requirement) may sync the tenant cluster 140 to the host cluster.

The tenant cluster 140 may generate a new controller requirement 150 for a new or requested custom resource (CR). The new controller requirement 150 may communicate with a controller 116 and the event-driven auto-scaler 114.

Figure 2:
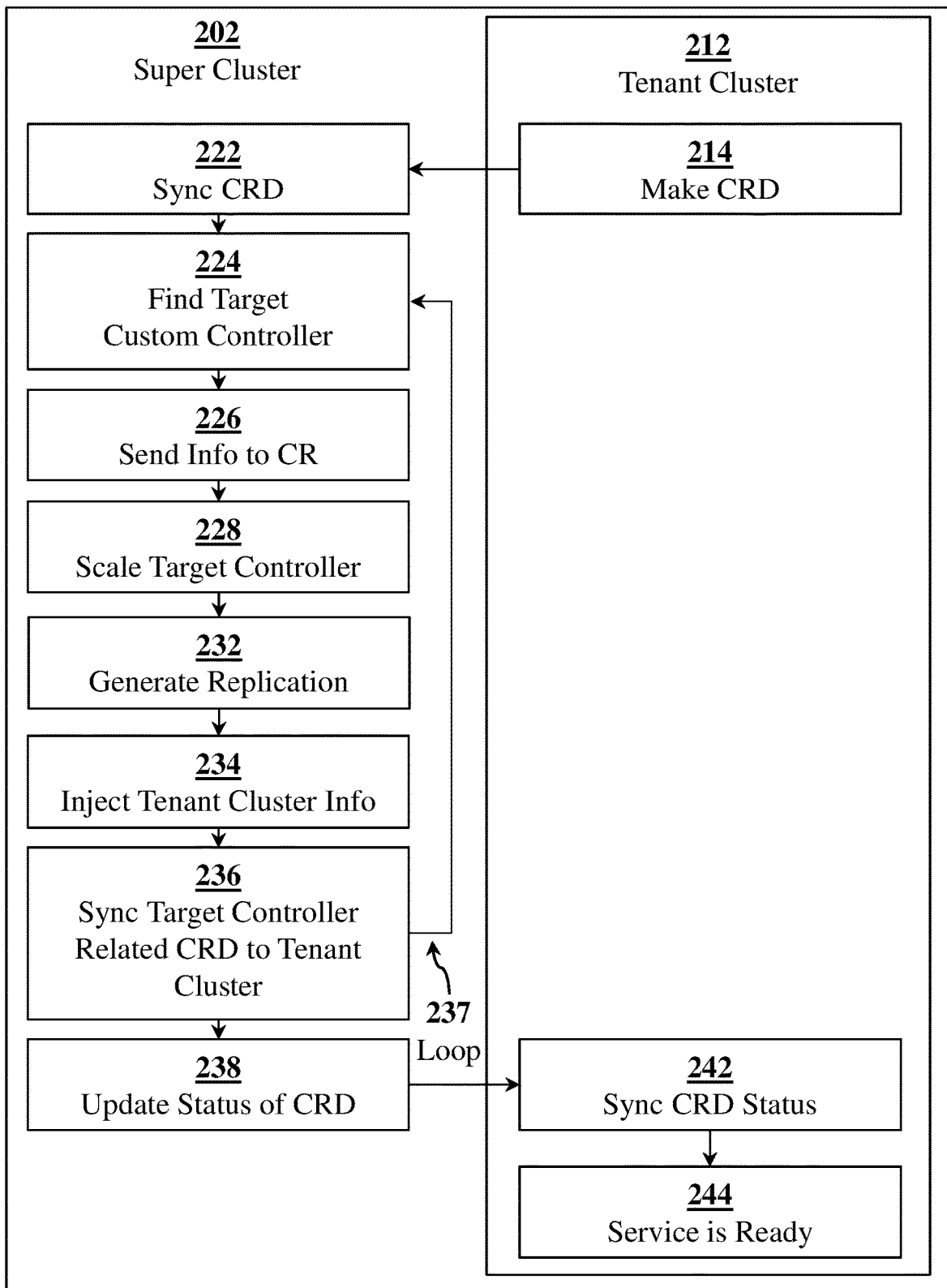
FIG. 2 depicts a cluster service request diagram in accordance with some embodiments of the present disclosure.

FIG. 2 depicts a cluster service request diagram 200 in accordance with some embodiments of the present disclosure. The cluster service request diagram 200 includes a super cluster 202 receiving and processing a request from a tenant cluster 212.

The tenant cluster 212 may make 214 a CRD. The CRD may be, for example, a CR controller requirement (e.g., new controller requirement 150 of FIG. 1). The tenant cluster 212 may communicate the CRD to the super cluster 202 to notify the super cluster 202 of a required controller service.

The super cluster 202 may use a syncer (e.g., syncer 130 of FIG. 1) to sync 222 the CRD from the tenant cluster 212. In some embodiments, the syncer may relay to the tenant cluster 212 that the communication has been received, the status of a resource request, and/or similar information.

The super cluster 202 may find 224 a target custom controller. In some embodiments, a syncer (e.g., syncer 130 of FIG. 1) and/or a controller (e.g., controller 116 of FIG. 1) may be used to find the target controller. In some embodiments, the controller may be targeted because it is related to the tenant cluster and/or the CRD (e.g., the controller is recognized as having capabilities that match the CRD requirements). The super cluster 202 may send 226 the information (e.g., the CRD requirements) to the CR.

The super cluster 202 may scale 228 the target controller. In some embodiments, an event-driven autoscaler (e.g., the event-driven autoscaler 114 of FIG. 1 or a KEDA) may be used to scale 228 the target controller.

The super cluster 202 may generate 232 a new replication and inject 234 tenant cluster information into the new replication. The information may include, for example, API information such as the tenant cluster API address and/or credential information. In some embodiments, a pod webhook (e.g., the pod mutation webhook 112 of FIG. 1) may be used to inject 234 the tenant cluster information into the new replication.

The super cluster 202 may sync 236 the target controller-related CRD to the tenant cluster 212 and update 238 the status of the CRD. In some embodiments, a controller (e.g., controller 116 of FIG. 1) may be used to update 238 the status of the CRD. The super cluster 202 may sync 242 the CRD status with the tenant cluster 212. In some embodiments, a controller (e.g., controller 116 of FIG. 1) may be used to sync 242 the status of the CRD with the tenant cluster 212. The super cluster 202 and/or tenant cluster 212 may then identify 244 that the service is ready such that the readied service may be used.

In some embodiments, achieving the appropriate amount of resources may require multiple iterations; thus, a loop 237 may be used to repeatedly scale 228 the target controller up until an objective scale is achieved. For example, an objective may be to scale up 228 a controller to be able to sustain three resources identified as necessary in the CRD.

Figure 3:
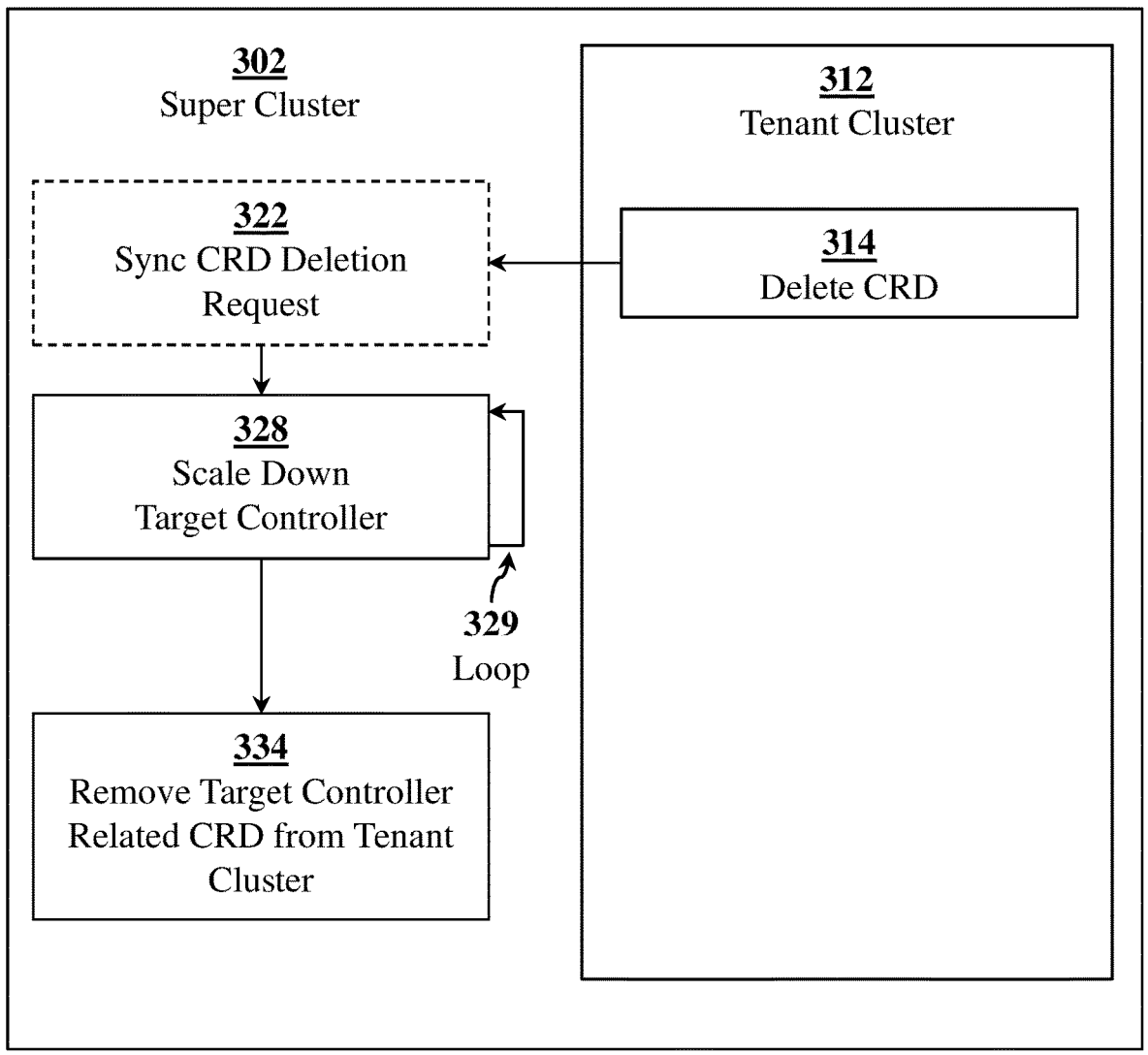
FIG. 3 illustrates cluster service termination diagram in accordance with some embodiments of the present disclosure.

FIG. 3 illustrates cluster service termination diagram 300 in accordance with some embodiments of the present disclosure. The cluster service termination diagram 300 includes a super cluster 302 receiving and processing a request from a tenant cluster 312.

The tenant cluster 312 may identify that a CRD is no longer needed. The tenant cluster 312 may relay a request to the super cluster 302 to delete 314 the CRD and/or otherwise notify the super cluster 302 that the CRD is no longer needed. Deleting a CRD may, for example, free up resources which may be reallocated elsewhere.

The super cluster 302 may sync 322 the request to delete the CRD. In some embodiments, a syncer (e.g., syncer 130 of FIG. 1) may be used to sync 322 the deletion request from the tenant cluster 312 to the super cluster 302. The super cluster 302 may scale down 328 the target controller. In some embodiments, an event-driven autoscaler (e.g., the event-driven autoscaler 114 of FIG. 1 or a KEDA) may be used to scale down 328 the target controller. In some embodiments, the scale down 328 of the target controller may take multiple iterations; thus, a loop 329 may be used to repeatedly scale down 328 the target controller until an objective scale is achieved. For example, an objective may be to scale down 328 all related controllers and/or related controller functionalities.

The super cluster 302 may remove 334 the target controller related CRD from the tenant cluster 312. In some embodiments, the syncer (e.g., syncer 130 of FIG. 1) may be used to remove 334 the target controller related CRD from the tenant cluster 312.

Figure 4:
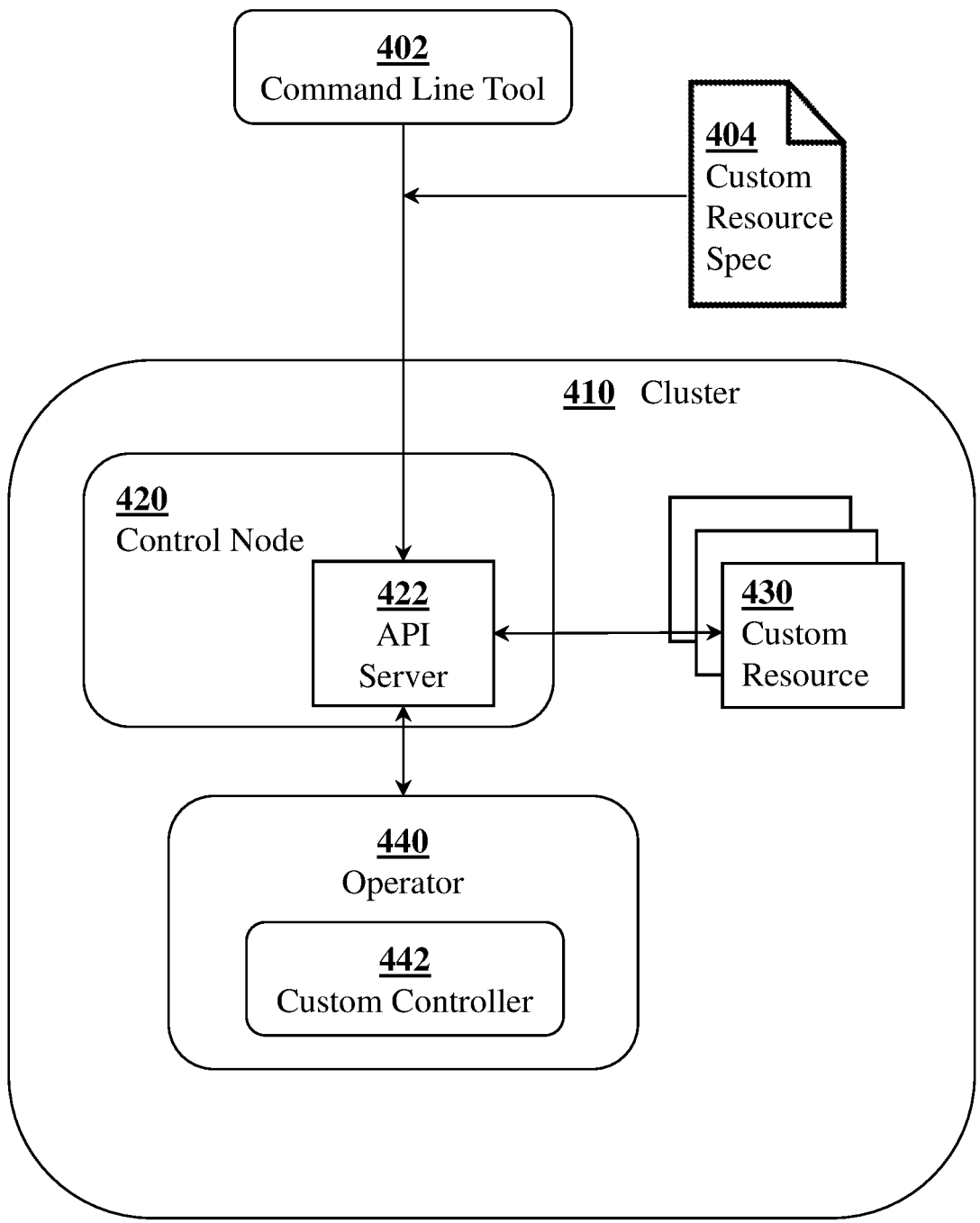
FIG. 4 depicts an open source container environment in accordance with some embodiments of the present disclosure.

FIG. 4 depicts an open source container environment 400 in accordance with some embodiments of the present disclosure. The open source container environment 400 includes a command line tool 402 and a custom resource specification 404 in communication with a cluster 410. In some embodiments, the cluster 410 may be a super cluster.

Specifically, the command line tool 402 and the custom resource specification 404 are in communication with an API server 422 in a control node 420 on the cluster 410. The API server 422 is in communication with a custom resource 430 on the cluster 410 as well as an operator 440 on the cluster 410. The operator 440 manages and runs a custom controller 442. The custom controller 442 monitors the custom resource 430 and may reconcile the custom resource 430 to the custom resource specification 404 as appropriate.

In some embodiments of the present disclosure, each custom controller registered may have at least one CRD. In some embodiments of the present disclosure, custom controllers may be used; in some embodiments, the custom controllers may be scanned and listed. For example, the custom controllers may be scanned and listed for preparing initial functionalities for a new replication for a new tenant.

A custom controller may be made tenant aware. For example, to make a custom controller tenant aware, one or more extended fields may be appended to the CRD; in some embodiments of the present disclosure, two extended fields may be used. The extended field(s) appended to the CRD may be read by the API server. For example, the extended fields may include a tenant-sensitive field and a controller-selector field.

In some embodiments, a tenant-sensitive field may be set to a default value of false. If the value is set to true and the application for the current tenant matches below a selector, a mean controller scaling may be triggered and performed. Thus, a new control plane may be generated for a new tenant.

In some embodiments, a controller-selector field may be set to a default value of null wherein null results in no selection. The controller-selector field may use labels for deployments and/or logic expressions.

For example, a CRD named "Policy" may have a group called "open-cluster-management.policy" that may be tenant sensitive. When a new tenant is generated, the add-on application "Policy controller" of advanced cluster management (ACM) may be enabled for the new tenant. In some embodiments, the add-on application may be automatically enabled.

A computer implemented method in accordance with the present disclosure may include registering a custom resource definition for a tenant with a host and scaling a controller for the customer resource definition. The method may include generating a replication using the customer resource definition, injecting information into the replication, and syncing a status of the custom resource definition between the host and the tenant.

In some embodiments of the present disclosure, the method may further include notifying the host of requirements for the tenant. In some embodiments, the host may generate the replication using the requirements.

In some embodiments of the present disclosure, the information may be injected into the replication using a pod webhook.

In some embodiments of the present disclosure, an event-driven autoscaling tool may scale the controller.

In some embodiments of the present disclosure, the method may include enhancing the custom resource definition for a sensitivity of the tenant.

In some embodiments of the present disclosure, the method may include enabling communication between the replication and a server.

In some embodiments of the present disclosure, the information may be application programming interface information.

Figure 5:
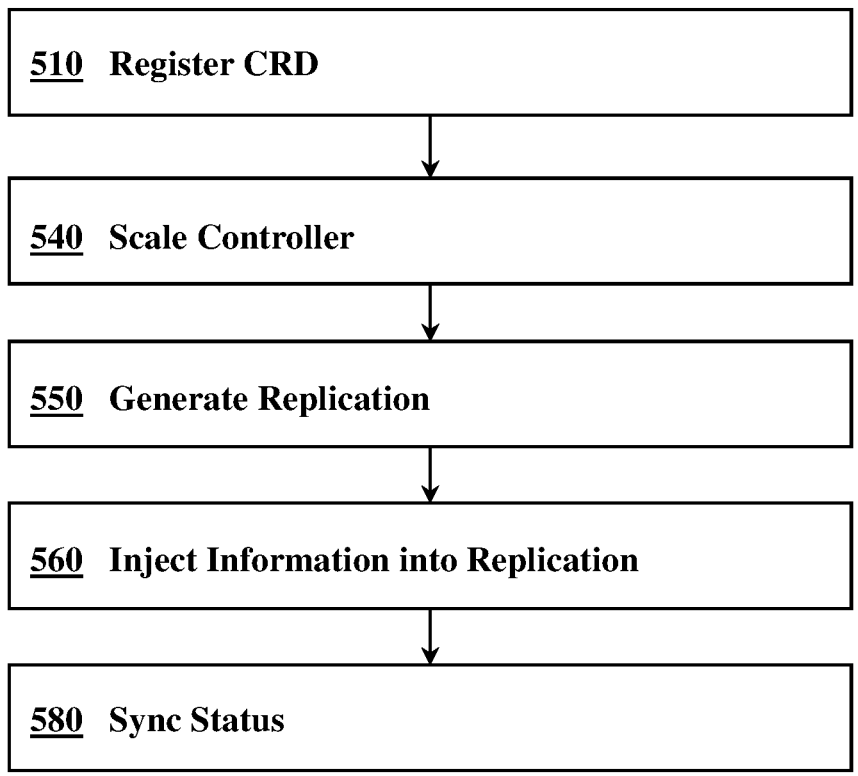
FIG. 5 illustrates a computer-implemented method in accordance with some embodiments of the present disclosure.

FIG. 5 illustrates a computer-implemented method 500 in accordance with some embodiments of the present disclosure. The method 500 may be performed in an open-source container environment (e.g., the super cluster system 100 of FIG. 1).

The method 500 includes registering 510 a CRD. In some embodiments, the CRD may be registered, for example, by a tenant cluster (e.g., tenant cluster 212 of FIG. 2) with a host cluster (e.g., super cluster 202).

The method 500 includes scaling 540 a controller. In some embodiments, the controller may be a target controller that may be scaled with an event-driven autoscaler (e.g., the event-driven autoscaler 114 of FIG. 1 or a KEDA).

The method 500 includes generating 550 a replication. In some embodiments, the replication may be generated by a host cluster (e.g., super cluster 202 of FIG. 2).

The method 500 includes injecting 560 information into the replication. The information injected into the replication may include, for example, API information such as the tenant cluster API address and/or credential information. In some embodiments, a host cluster (e.g., super cluster 202 of FIG. 2) and/or a pod webhook (e.g., the pod mutation webhook 112 of FIG. 1) may be used to inject the tenant cluster information into the new replication.

The method 500 includes syncing 580 the status of the CRD. The CRD status may be synced between a host cluster and a tenant cluster such that the tenant cluster is notified that the service is ready. In some embodiments, the syncing 580 may be done by a host cluster (e.g., super cluster 202 of FIG. 2); in some embodiments, the host cluster may use a controller (e.g., controller 116 of FIG. 1) to sync the status of the CRD. In some embodiments, the tenant cluster (e.g., tenant cluster 212) may monitor the status of the CRD and sync 580 the status of the CRD when a change occurs.

Figure 6:
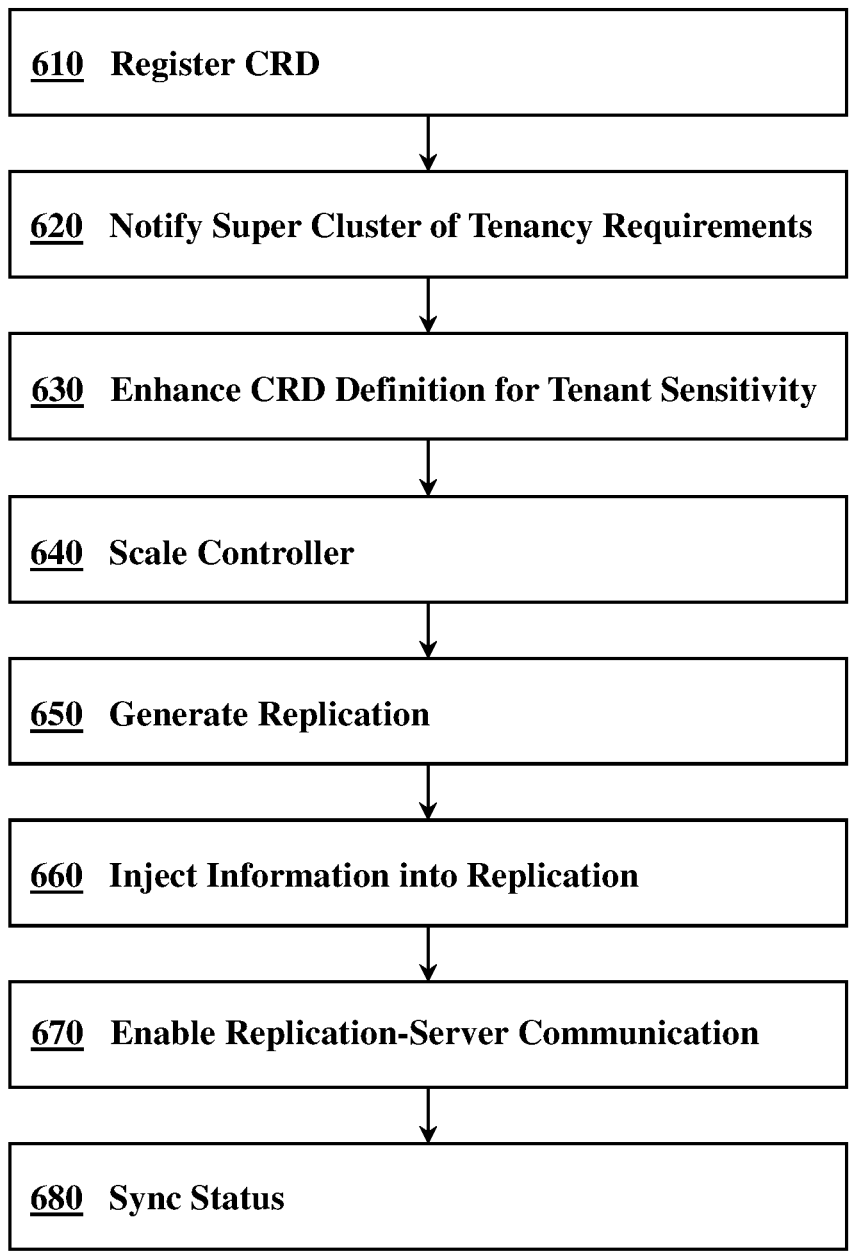
FIG. 6 depicts a computer-implemented method in accordance with some embodiments of the present disclosure.

FIG. 6 depicts a computer-implemented method 600 in accordance with some embodiments of the present disclosure. The method 600 may be performed in an open-source container environment (e.g., the super cluster system 100 of FIG. 1).

The method 600 includes registering 610 a CRD. In some embodiments, the CRD may be registered, for example, by a tenant cluster (e.g., tenant cluster 212 of FIG. 2) with a host cluster (e.g., super cluster 202).

The method 600 includes notifying 620 the host cluster of tenancy requirements of a CRD. A tenant cluster (e.g., tenant cluster 140) may notify the host cluster (e.g., super cluster 202) of any tenancy requirements via a command line tool (e.g., command line tool 402) and/or a custom resource specification (e.g., a custom resource specification 404) in communication with a cluster (e.g., cluster 410) such as a super cluster (e.g., super cluster 202).

The method 600 includes enhancing 630 the CRD definition for tenant sensitivity. In some embodiments, a controller (e.g., a custom controller) may be made tenant aware. For example, to make a custom controller tenant aware, one or more extended fields may be appended to the CRD; the extended field(s) appended to the CRD may be read by the API server. In some embodiments, the extended fields may include, for example, a tenant-sensitive field and a controller-selector field.

In some embodiments, a tenant-sensitive field may be set to a default value of false: if the value is set to true and the application for the current tenant matches below a selector, a mean controller scaling may be triggered and performed; thus, a new control plane may be generated for a new tenant. For example, a CRD may be tenant sensitive; when a new tenant is generated, an add-on application of an ACM may be enabled for the new tenant.

The method 600 includes scaling 640 a controller. In some embodiments, the controller may be a target controller that may be scaled with an event-driven autoscaler (e.g., the event-driven autoscaler 114 of FIG. 1 or a KEDA).

The method 600 includes generating 650 a replication. In some embodiments, the replication may be generated by a host cluster (e.g., super cluster 202 of FIG. 2).

The method 600 includes injecting 660 information into the replication. The information injected into the replication may include, for example, API information such as the tenant cluster API address and/or credential information. In some embodiments, a host cluster (e.g., super cluster 202 of FIG. 2) and/or a pod webhook (e.g., the pod mutation webhook 112 of FIG. 1) may be used to inject the tenant cluster information into the new replication.

The method 600 includes enabling 670 communication between the replication and the server. Enabling 670 communication between a replication and a server may include, for example, appending one or more fields (e.g., a tenant-sensitive field and/or a controller-selector field) to the CRD which may be read by an API server. Enabling 670 communication between a replication and a server may include, for example, syncing a target controller related CRD (e.g., controller requirement 150) to a tenant cluster (e.g., tenant cluster 140).

The method 600 includes syncing 680 the status of the CRD. The CRD status may be synced between a host cluster and a tenant cluster such that the tenant cluster is notified that the service is ready. In some embodiments, the syncing 680 may be done by a host cluster (e.g., super cluster 202 of FIG. 2); in some embodiments, the host cluster may use a controller (e.g., controller 116 of FIG. 1) to sync the status of the CRD. In some embodiments, the tenant cluster (e.g., tenant cluster 212) may monitor the status of the CRD and sync 680 the status of the CRD when a change occurs.

A computer program product in accordance with the present disclosure may include a computer readable storage medium having program instructions embodied therewith. The program instructions may be executable by a processor to cause the processor to perform a function. The function may include registering a custom resource definition for a tenant with a host and scaling a controller for the customer resource definition. The function may include generating a replication using the customer resource definition, injecting information into the replication, and syncing a status of the custom resource definition between the host and the tenant.

In some embodiments of the present disclosure, the function may include notifying the host of requirements for the tenant. In some embodiments, the host may generate the replication using the requirements.

In some embodiments of the present disclosure, the information may be injected into the replication using a pod webhook.

In some embodiments of the present disclosure, an event-driven autoscaling tool scales the controller.

In some embodiments of the present disclosure, the function may include enhancing the custom resource definition for a sensitivity of the tenant.

In some embodiments of the present disclosure, the function may include enabling communication between the replication and a server.

In some embodiments of the present disclosure, the information may be application programming interface information.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment currently known or that which may be later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly release to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but the consumer has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software which may include operating systems and applications. The consumer does not manage or control the underlying cloud infrastructure but has control over operating systems, storage, and deployed applications, and the consumer possibly has limited control of select networking components (e.g., host firewalls).

Deployment models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and/or compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
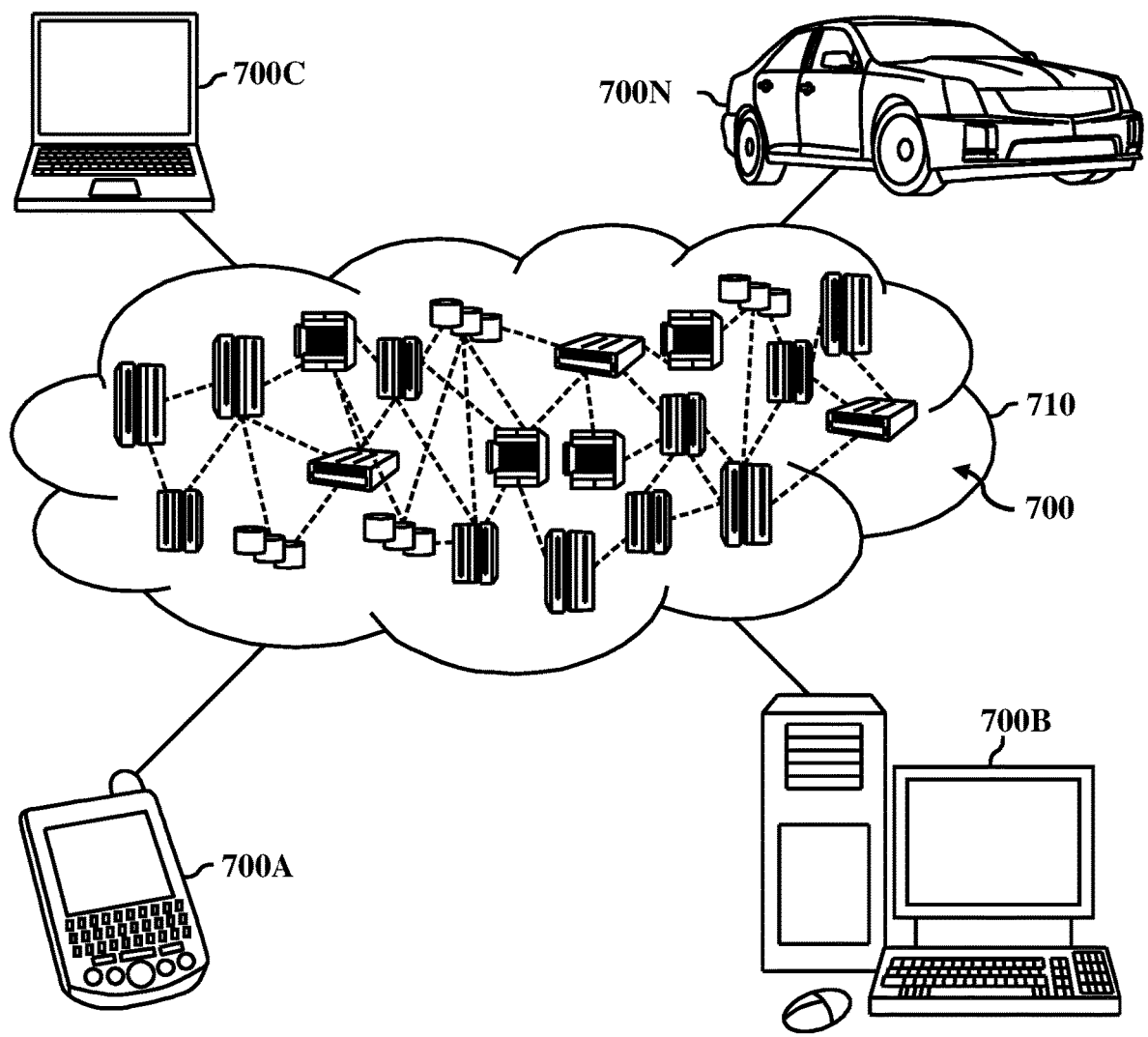
FIG. 7 illustrates a cloud computing environment in accordance with embodiments of the present disclosure.

FIG. 7 illustrates a cloud computing environment 710 in accordance with embodiments of the present disclosure. As shown, cloud computing environment 710 includes one or more cloud computing nodes 700 with which local computing devices used by cloud consumers such as, for example, personal digital assistant (PDA) or cellular telephone 700A, desktop computer 700B, laptop computer 700C, and/or automobile computer system 700N may communicate. Nodes 700 may communicate with one another. They may be grouped (not shown) physically or virtually, in one or more networks, such as private, community, public, or hybrid clouds as described hereinabove, or a combination thereof.

This allows cloud computing environment 710 to offer infrastructure, platforms, and/or software as services for which a cloud consumer does not need to maintain resources on a local computing device. It is understood that the types of computing devices 700A-N shown in FIG. 7 are intended to be illustrative only and that computing nodes 700 and cloud computing environment 710 can communicate with any type of computerized device over any type of network and/or network addressable connection (e.g., using a web browser).

Figure 8:
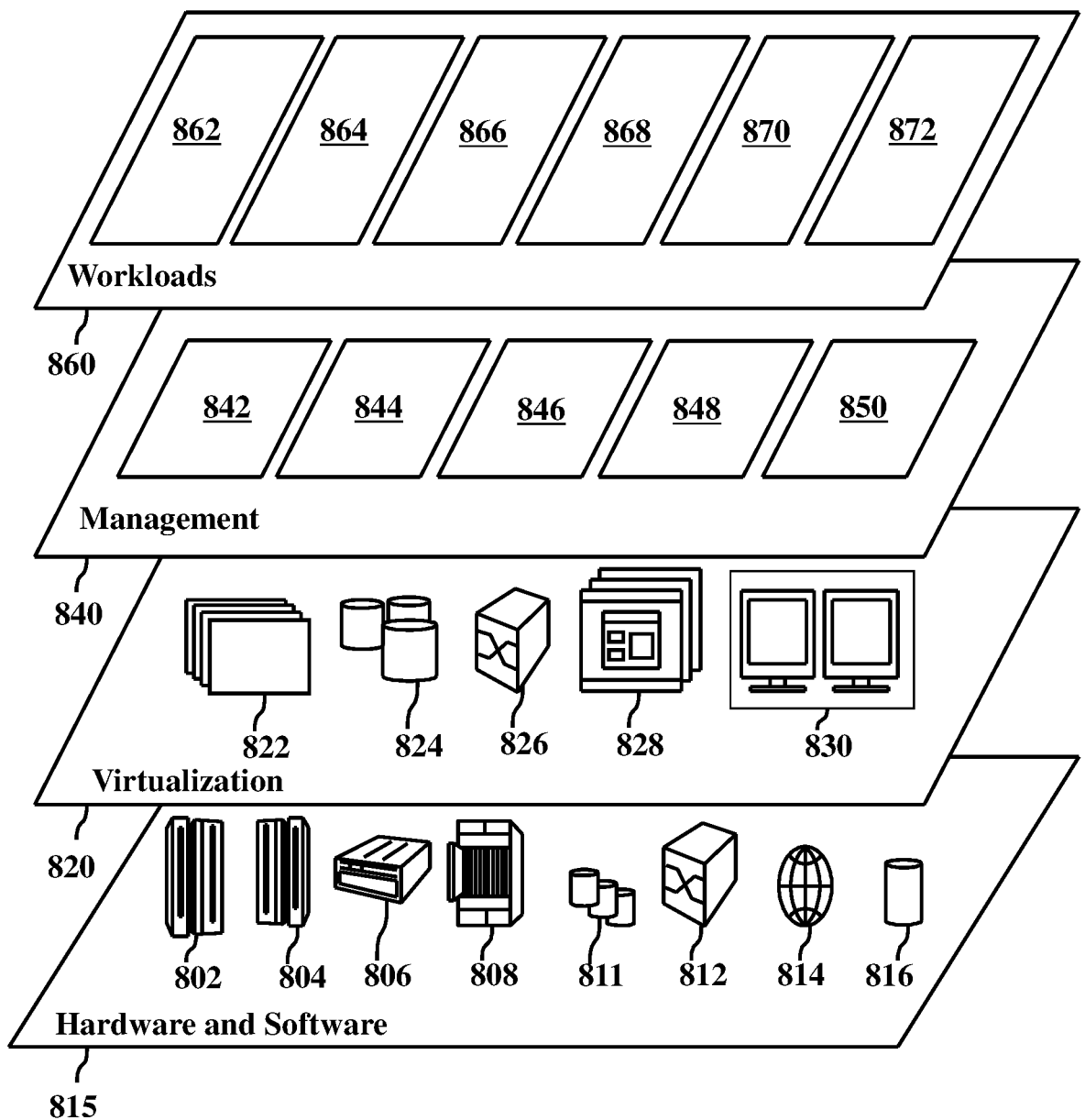
FIG. 8 depicts abstraction model layers in accordance with embodiments of the present disclosure.

FIG. 8 illustrates abstraction model layers 800 provided by cloud computing environment 710 (FIG. 7) in accordance with embodiments of the present disclosure. It should be understood in advance that the components, layers, and functions shown in FIG. 8 are intended to be illustrative only and embodiments of the disclosure are not limited thereto. As depicted below, the following layers and corresponding functions are provided.

Hardware and software layer 815 includes hardware and software components. Examples of hardware components include: mainframes 802; RISC (Reduced Instruction Set Computer) architecture-based servers 804; servers 806; blade servers 808; storage devices 811; and networks and networking components 812. In some embodiments, software components include network application server software 814 and database software 816.

Virtualization layer 820 provides an abstraction layer from which the following examples of virtual entities may be provided: virtual servers 822; virtual storage 824; virtual networks 826, including virtual private networks; virtual applications and operating systems 828; and virtual clients 830.

In one example, management layer 840 may provide the functions described below. Resource provisioning 842 provides dynamic procurement of computing resources and other resources that are utilized to perform tasks within the cloud computing environment. Metering and pricing 844 provide cost tracking as resources and are utilized within the cloud computing environment as well as billing or invoicing for consumption of these resources. In one example, these resources may include application software licenses. Security provides identity verification for cloud consumers and tasks as well as protection for data and other resources. User portal 846 provides access to the cloud computing environment for consumers and system administrators. Service level management 848 provides cloud computing resource allocation and management such that required service levels are met. Service level agreement (SLA) planning and fulfillment 850 provide pre-arrangement for, and procurement of, cloud computing resources for which a future requirement is anticipated in accordance with an SLA.

Workloads layer 860 provides examples of functionality for which the cloud computing environment may be utilized. Examples of workloads and functions which may be provided from this layer include: mapping and navigation 862; software development and lifecycle management 864; virtual classroom education delivery 866; data analytics processing 868; transaction processing 870; and extend controller for multitenancy 872.

Figure 9:
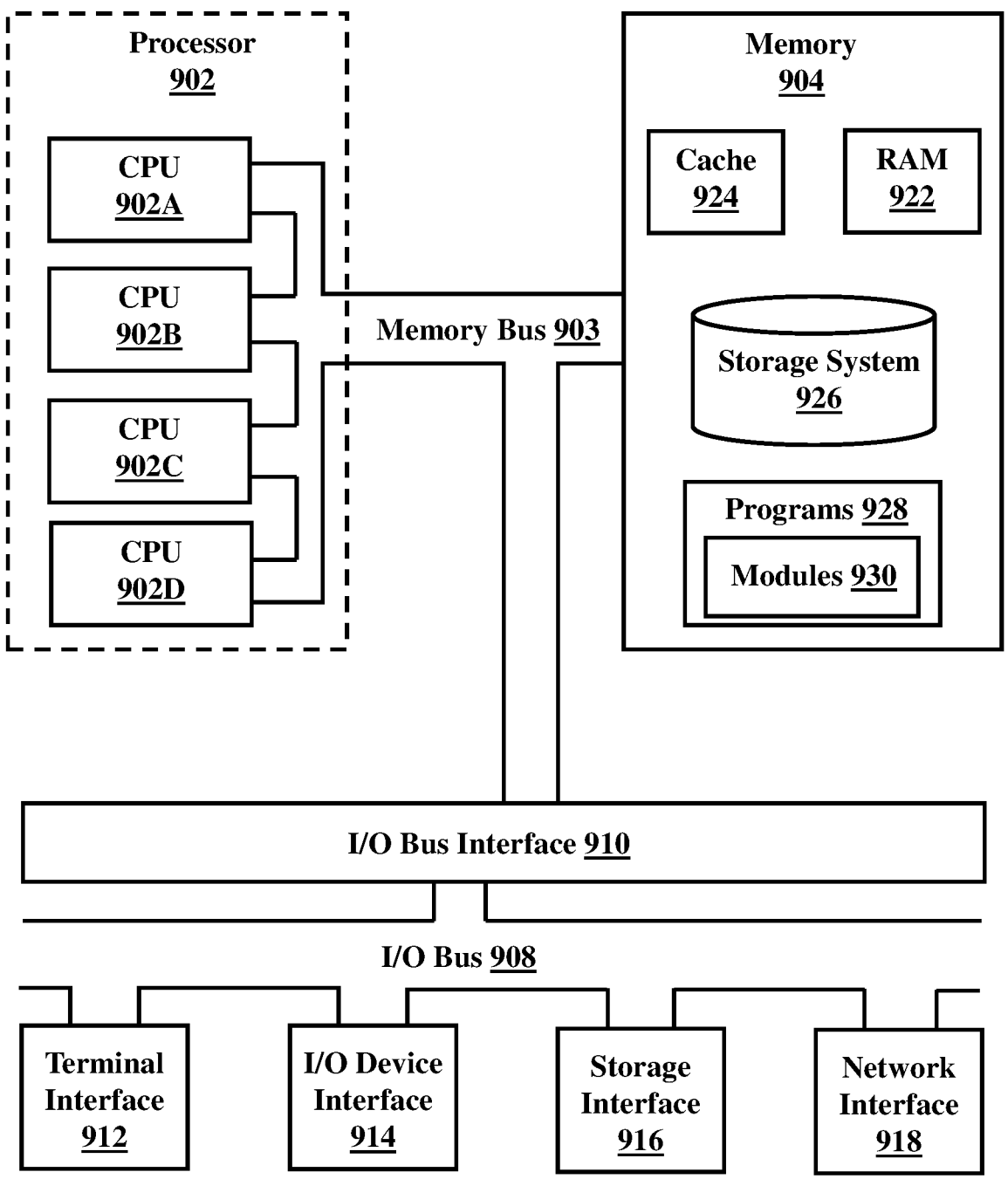
FIG. 9 illustrates a high-level block diagram of an example computer system that may be used in implementing one or more of the methods, tools, and modules, and any related functions, described herein, in accordance with embodiments of the present disclosure.

FIG. 9 illustrates a high-level block diagram of an example computer system 901 that may be used in implementing one or more of the methods, tools, and modules, and any related functions, described herein (e.g., using one or more processor circuits or computer processors of the computer) in accordance with embodiments of the present disclosure. In some embodiments, the major components of the computer system 901 may comprise a processor 902 with one or more central processing units (CPUs) 902A, 902B, 902C, and 902D, a memory subsystem 904, a terminal interface 912, a storage interface 916, an I/O (Input/Output) device interface 914, and a network interface 918, all of which may be communicatively coupled, directly or indirectly, for inter-component communication via a memory bus 903, an I/O bus 908, and an I/O bus interface unit 910.

The computer system 901 may contain one or more general-purpose programmable CPUs 902A, 902B, 902C, and 902D, herein generically referred to as the CPU 902. In some embodiments, the computer system 901 may contain multiple processors typical of a relatively large system; however, in other embodiments, the computer system 901 may alternatively be a single CPU system. Each CPU 902 may execute instructions stored in the memory subsystem 904 and may include one or more levels of on-board cache.

System memory 904 may include computer system readable media in the form of volatile memory, such as random access memory (RAM) 922 or cache memory 924. Computer system 901 may further include other removable/non-removable, volatile/non-volatile computer system storage media. By way of example only, storage system 926 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM, or other optical media can be provided. In addition, memory 904 can include flash memory, e.g., a flash memory stick drive or a flash drive. Memory devices can be connected to memory bus 903 by one or more data media interfaces. The memory 904 may include at least one program product having a set (e.g., at least one) of program modules that are configured to carry out the functions of various embodiments.

One or more programs/utilities 928, each having at least one set of program modules 930, may be stored in memory 904. The programs/utilities 928 may include a hypervisor (also referred to as a virtual machine monitor), one or more operating systems, one or more application programs, other program modules, and program data. Each of the operating systems, one or more application programs, other program modules, and program data, or some combination thereof, may include an implementation of a networking environment. Programs 928 and/or program modules 930 generally perform the functions or methodologies of various embodiments.

Although the memory bus 903 is shown in FIG. 9 as a single bus structure providing a direct communication path among the CPUs 902, the memory subsystem 904, and the I/O bus interface 910, the memory bus 903 may, in some embodiments, include multiple different buses or communication paths, which may be arranged in any of various forms, such as point-to-point links in hierarchical, star, or web configurations, multiple hierarchical buses, parallel and redundant paths, or any other appropriate type of configuration. Furthermore, while the I/O bus interface 910 and the I/O bus 908 are shown as single respective units, the computer system 901 may, in some embodiments, contain multiple I/O bus interface units 910, multiple I/O buses 908, or both. Further, while multiple I/O interface units 910 are shown, which separate the I/O bus 908 from various communications paths running to the various I/O devices, in other embodiments some or all of the I/O devices may be connected directly to one or more system I/O buses 908.

In some embodiments, the computer system 901 may be a multi-user mainframe computer system, a single-user system, a server computer, or similar device that has little or no direct user interface but receives requests from other computer systems (clients). Further, in some embodiments, the computer system 901 may be implemented as a desktop computer, portable computer, laptop or notebook computer, tablet computer, pocket computer, telephone, smartphone, network switches or routers, or any other appropriate type of electronic device.

It is noted that FIG. 9 is intended to depict the representative major components of an exemplary computer system 901. In some embodiments, however, individual components may have greater or lesser complexity than as represented in FIG. 9, components other than or in addition to those shown in FIG. 9 may be present, and the number, type, and configuration of such components may vary.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide, or other transmission media (e.g., light pulses passing through a fiber-optic cable) or electrical signals transmitted through a wire.

Computer readable program instructions described herein can be downloaded to respective computing/processing devices from a computer readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer, or entirely on a remote computer or server. In the latter scenario, the remote computer may be connected to the user's computer through any type of network, including a local area network (LAN) or a wide area network (WAN) or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of instructions which comprises one or more executable instructions for implementing the specified logical function(s). In some alternative implementations, the functions noted in the blocks may occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although the present disclosure has been described in terms of specific embodiments, it is anticipated that alterations and modifications thereof will become apparent to the skilled in the art. The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application, or the technical improvement over technologies found in the marketplace or to enable others of ordinary skill in the art to understand the embodiments disclosed herein. Therefore, it is intended that the following claims be interpreted as covering all such alterations and modifications as fall within the true spirit and scope of the disclosure.

What is claimed is:

1. A system, said system comprising:
a memory; and
a processor in communication with said memory, said processor being configured to perform operations, said operations comprising:
registering a custom resource definition for a tenant with a host;
scaling a controller for said custom resource definition;
generating a replication using said custom resource definition, wherein said replication is dedicated to said tenant;
injecting tenant cluster information into said replication, wherein said information is injected into said replication using a pod webhook; and
syncing a status of said custom resource definition between said host and said tenant.

2. The system of claim 1, said operations further comprising:
notifying said host of requirements for said tenant.

3. The system of claim 1, wherein:
an event-driven autoscaling tool scales said controller.

4. The system of claim 1, said operations further comprising:
enhancing said custom resource definition for a sensitivity of said tenant.

5. The system of claim 1, said operations further comprising:
enabling communication between said replication and a server.

6. The system of claim 1, wherein:
said information is application programming interface information.

7. A computer implemented method, said computer implemented method comprising:
registering a custom resource definition for a tenant with a host;
scaling a controller for said custom resource definition;
generating a replication using said custom resource definition, wherein said replication is dedicated to said tenant;
injecting tenant cluster information into said replication, wherein said information is injected into said replication using a pod webhook; and
syncing a status of said custom resource definition between said host and said tenant.

8. The computer implemented method of claim 7, further comprising:
notifying said host of requirements for said tenant.

9. The computer implemented method of claim 8, wherein:
said host generates said replication using said requirements.

10. The computer implemented method of claim 7, wherein:
an event-driven autoscaling tool scales said controller.

11. The computer implemented method of claim 7, further comprising:
enhancing said custom resource definition for a sensitivity of said tenant.

12. The computer implemented method of claim 7, further comprising:
enabling communication between said replication and a server.

13. The computer implemented method of claim 7, wherein:
   said information is application programming interface information.

14. A computer program product, said computer program product comprising a computer readable storage medium having program instructions embodied therewith, said program instructions executable by a processor to cause said processor to perform a function, said function comprising:
   registering a custom resource definition for a tenant with a host;
   scaling a controller for said custom resource definition;
   generating a replication using said custom resource definition, wherein said replication is dedicated to said tenant;
   injecting tenant cluster information into said replication, wherein said information is injected into said replication using a pod webhook; and
   syncing a status of said custom resource definition between said host and said tenant.

15. The computer program product of claim 14, further comprising:
   notifying said host of requirements for said tenant.

16. The computer program product of claim 14, further comprising:
   enhancing said custom resource definition for a sensitivity of said tenant.

17. The computer program product of claim 14, further comprising:
   enabling communication between said replication and a server.

\* \* \* \* \*